Feb. 11, 1958   J. H. SCHAEFER   2,823,248
SELF-SEALING CABLE CLAMP
Filed Sept. 29, 1953
Fig. 1.
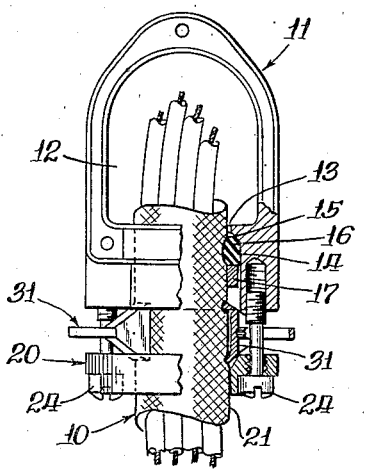
Fig. 2.
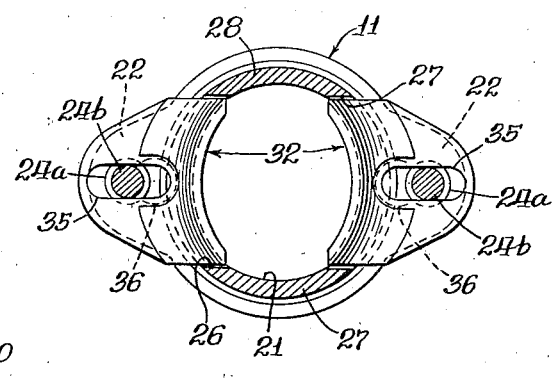
Fig. 3.
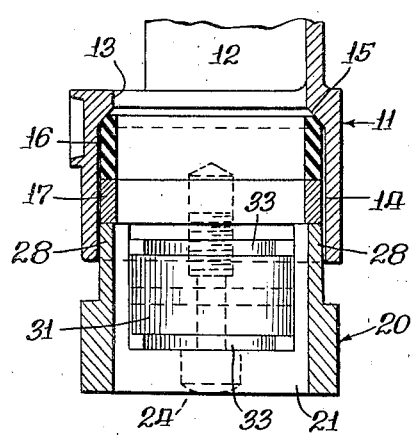
Fig. 4.
Fig. 5.
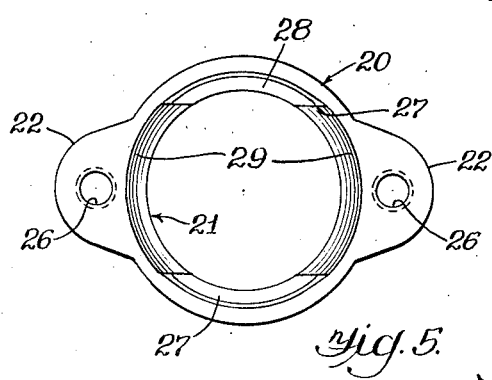
INVENTOR.
James H. Schaefer
BY
L. F. Hammond, Atty.

United States Patent Office 2,823,248
Patented Feb. 11, 1958

2,823,248

SELF-SEALING CABLE CLAMP

James H. Schaefer, Lemont, Ill., assignor to Amphenol Electronics Corporation, a corporation of Illinois Application September 29, 1953, Serial No. 383,089

4 Claims. (Cl. 174—77)

This invention relates to cable clamps for insulated electrical cables, and has as its primary object the provision of cable clamping devices designed to effect a strong mechanical joint between a flexible cable and a metallic shell or housing, yet to afford an adequate seal around the cable. The accomplishment of this object involves the provision of means for attaching the cable to the shell in a dependable and secure manner, so that it is adequately held to withstand tension or torsional stresses. At the same time, it requires the provision of an immersion-proof, watertight, substantially airtight seal between the cable and the shell. Obviously, this seal should be capable of withstanding continued immersion or moderate pressure without leakage.

A further object of the invention is the provision of a cable clamp which is quick and easy to assemble or disassemble, with the coacting parts so designed as to permit loosening or detaching of the cable without undue risk of losing the screws, wedges or other small parts of the clamping assembly.

A further object of the invention resides in the provision of a self-sealing cable clamp assembly wherein the coacting parts of the device are relatively small, light in weight and compactly grouped. Thus, the clamping assembly is not of unduly large size with relation to the size of the cable which it accommodates.

A further object is the provision of a self-sealing cable clamp wherein the coacting parts are of relatively simple mechanical design and are consequently well adapted to economical manufacture by mass production methods.

The foregoing objects are accomplished according to the present invention by a unique sealing and clamping subassembly adapted to be utilized in connection with a metallic shell or other fitting having a bore into which an insulated electrical cable extends. As illustrated, the preferred embodiment of the invention includes a plurality of cable clamping wedges adapted to mechanically grip the cable, together with an annular sealing gasket arranged to effect an airtight and watertight seal, with means whereby both said gasket and said gripping wedges are simultaneously tightened upon the cable by a single pair of clamping screws. The sealing and clamping devices are so designed that their coacting parts may be easily separated if desired, but are not apt to become completely detached from each other unintentionally. That is, the parts are designed to retain themselves in a subassembly even when removed from the metallic shell to which they are normally attached, unless deliberately separated.

A preferred embodiment of the invention is illustrated in the drawings of the present specification, wherein:

Figure 1 is an elevational view of a connector shell and cable clamp in accordance with the present invention, with the parts broken away to illustrate the union between the cable and the shell;

Figure 2 is an enlarged detail sectional view through the cable bore of the shell, showing the relationship of the sealing and clamping devices associated therewith;

Figure 3 is a fragmental detail cross sectional view taken substantially on the plane of the line 3—3 of Figure 2;

Figure 4 is a detail cross sectional view taken substantially on the plane of the line 4—4 of Figure 2; and Figure 5 is a plan view of the interior face of a clamping cap employed in the invention.

The cable clamp illustrated and described herein is designed primarily for connecting a flexible insulated electrical cable to any type of connector housing, fitting or shell. In the present drawings, a typical cable is represented by reference numeral 10, shown as being attached to a typical metallic shell 11. As illustrated, the shell includes an inside cavity 12 with a cable aperture or bore 13 through which the end of the flexible cable 10 may be inserted.

The bore 13 has a deep counterbore 14 terminating in an angularly inclined bottom shoulder 15. The counterbore 14 is adapted to receive a cable sealing gasket consisting of a resilient pliable ring 16. The ring 16 is preferably of rubber, but synthetic rubber or other yieldable plastic material may be employed. A rigid metallic backing ring 17 is free to slide in the counterbore 14 and is adapted to be forced inwardly by a clamping member or cap generally designated by the numeral 20 (Figure 5). The cap 20 has an internal bore 21 to receive the cable 10, with a pair of lugs 22 each having a threaded screw aperture 23 through which a pair of cap screws 24 extend. The end portions 24a of the cap screws may be threaded directly into bores 25 in the shell (Figure 2) to urge the cap inwardly, and, as shown, the screws 24 have reduced diameter shank portions 24b to clear the threads in the screw apertures 23.

The inner face of the clamping cap 20 (Figure 5) includes an inwardly extending sleeve portion cut away at 27 to provide a pair of arcuately shaped clamp follower portions 28. The clamp follower portions 28 extend into the counterbore 14 and bear against the exposed face of the backing ring 17, so that the resilient ring gasket 16 is compressed when the cap screws 24 are tightened. Thus, when the cap screws 24 are tightened, the ring gasket 16 is compressed against the outer surface of the cable to effect a substantially airtight and watertight seal, as indicated in Figure 1.

The tightening of the cap screws 24 also causes the cable 10 to be mechanically gripped by a pair of clamp wedges 31. These wedges are disposed between the cap 20 and the shell 11, and are positioned in the cutaway portions 27 between the clamp follower portions 28. The wedges have inclined bottom surfaces 38 and top surfaces 39 adapted to bear upon the shell 11 and cap 20, respectively, so that the wedges are forced inwardly toward each other when the cap screws 24 are tightened. The clamp wedges 31 have concave faces 32 (Figure 4) each provided with projecting tooth portions 33 (Figure 2) so that the teeth 33 may bite into the insulating cover of the cable sufficiently to insure a firm physical grip.

The clamps 31 are provided with retaining ears 34 slotted at 35 (Figure 4) to receive the reduced diameter shank portions 24b of the cap screws 24. The ears are threaded at 36 so that the threaded end portions 24a of the cap screws 24 (which are first threaded through the threaded apertures 23 in the cap 20) may then be threaded through the ears of the clamping wedges. With this arrangement, the cap screws will not become disassembled accidentally, and are not apt to be dropped or lost. The wedges 31, cap screws 24 and cap 20 remain as an assembled unit, even when completely removed from the shell 11.

From the foregoing, it will be seen that the structure disclosed herein provides a relatively simple mechanism which is adapted to hold a cable with a firm mechanical grip and to simultaneously effect a seal capable of withstanding considerable pressure. Moreover, the union between the cable and the shell may be rendered substantially airtight and watertight, yet may be easily, quickly and conveniently released without undue risk of losing the component parts of the sealing and clamping assembly, since if required, the cap 20 and wedges 31 are held in assembled relation by the cap screws 24, even when these screws are completely detached from the shell 11.

Having thus described my invention, what I claim as new and desire to secure by United States Letters Patent is:

1. A self-sealing cable clamp comprising, in combination, a shell having a bore extending into an interior cavity, and an enlarged counterbore extending from the exterior of the shell to an inclined annular bottom shoulder; a sealing gasket consisting of a pliable plastic ring disposed within said counterbore and adapted to bear against the inclined bottom shoulder, a relatively rigid metallic backing ring adjacent said sealing gasket and also disposed within said counterbore, with clamping devices comprising a cap extending across the top of the counterbore in a position exterior of the shell and secured to said shell by a plurality of cap screws disposed parallel with the counterbore and threaded into said shell, said cap including a cable aperture in substantial alignment with the counterbore of the shell and having a pair of inwardly extending follower portions of arcuate configuration fitting within the counterbore and adapted to bear on the metallic backing ring, with a pair of radially shiftable cable clamp wedges disposed between said arcuate follower portions and between said cap and shell; the said clamping wedges being adapted to lie on opposite sides of a cable extending through said cap and counterbore; said clamping wedges including perforated ear portions receiving the shanks of the aforementioned cap screws and having inclined surfaces on their bottom and top faces adapted to coact with corresponding surfaces on the shell and cap respectively, whereby said clamping wedges are forced radially inwardly against the opposite sides of the cable and the aforementioned sealing gasket simultaneously compressed by tightening said cap screws.

2. A self-sealing cable clamp comprising, in combination, a shell having a bore extending into an interior cavity, and an enlarged counterbore extending from the exterior of the shell to an inclined annular bottom shoulder; a sealing gasket consisting of a pliable plastic ring disposed within said counterbore and adapted to bear against the inclined bottom shoulder, a relatively rigid metallic backing ring adjacent said sealing gasket and also disposed within said counterbore, with clamping devices comprising a cap extending across the top of the counterbore in a position exterior of the shell and secured to said shell by a plurality of cap screws disposed parallel with the counterbore and threaded into said shell, said cap including a cable aperture in substantial alignment with the counterbore of the shell; with a pair of radially shiftable cable clamp wedges disposed between said cap and shell; the said clamping wedges being adapted to lie on opposite sides of a cable extending through said cap and counterbore; said clamping wedges having inclined surfaces on their bottom and top faces adapted to coact with corresponding surfaces on the shell and cap respectively, whereby said clamping wedges are forced radially inwardly against the opposite sides of the cable and the aforementioned sealing gasket simultaneously compressed by tightening said cap screws.

3. A self-sealing cable clamp comprising, in combination, a shell having a bore extending into an interior cavity, and a sealing gasket within said bore and adapted to bear against the exterior surface of a flexible cable therein; with clamping devices comprising a cap extending across the top of the counterbore in a position exterior of the shell and secured to said shell by a plurality of cap screws; with a pair of radially shiftable cable clamp wedges disposed between said cap and shell; the said clamping wedges being adapted to lie on opposite sides of the cable and including perforated ear portions receiving the shanks of the aforementioned cap screws and having inclined surfaces on their bottom and top faces adapted to coact with corresponding surfaces on the shell and cap respectively, whereby said clamping wedges are forced against the opposite sides of the cable by tightening said cap screws.

4. A self-sealing cable clamp comprising, in combination, a shell having a bore extending into an interior cavity, and a sealing gasket within said bore and adapted to bear against the exterior surface of a flexible cable therein; with clamping devices comprising a cap extending across the top of the counterbore in a position exterior of the shell and secured to said shell; with a pair of radially shiftable cable clamp wedges disposed between said cap and shell; the said clamping wedges being adapted to lie on opposite sides of the cable and having inclined surfaces on their bottom and top faces adapted to coact with corresponding surfaces on the shell and cap respectively, whereby said clamping wedges are forced against the opposite sides of the cable by tightening said cap.

References Cited in the file of this patent

UNITED STATES PATENTS

| | | |
|---|---|---|
| 1,323,147 | Becker | Nov. 25, 1919 |
| 2,170,393 | Tornblom | Aug. 22, 1939 |
| 2,304,167 | Hayes | Dec. 8, 1942 |
| 2,454,838 | Richardson et al. | Nov. 30, 1948 |